PHONOGRAPH TONE ARM POSITIONER

Filed Oct. 21, 1946

INVENTOR
WILHELMUS LAMBERTUS LEONARDUS VIVIE

BY G. F. Vandervoort[?]
ATTORNEY.

Patented July 1, 1952 2,601,987

UNITED STATES PATENT OFFICE 2,601,987

PHONOGRAPH TONE ARM POSITIONER

Wilhelmus Lambertus Leonardus Vivie, Eindhoven, Netherlands, assignor to Hartford National Bank and Trust Company, Hartford, Conn., trustee Application October 21, 1946, Serial No. 704,702
In the Netherlands August 13, 1945

Section 1, Public Law 690, August 8, 1946
Patent expires August 13, 1965

3 Claims. (Cl. 274—25)

Figure 1:
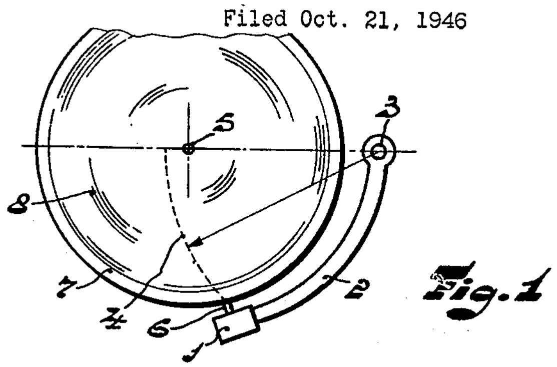

Tone arm assemblies for phonographs are known which comprise a member which, upon positioning the tone arm, rests on the record. The motion of the record (the peripheral speed) permits the position of the member to be varied in such a manner that, for example by turning away or tilting this member, that the tone arm needle rests on the record. The object of this known construction is to protect the tone arm needle, which often consists of a sensitive sapphire or tungsten point, as much as possible against damage when the tone arm is out of service. Furthermore, the use of such a member prevents the needle point from contacting too roughly with the record in positioning the tone arm. Owing to the movement of the record this protecting member is turned away from its initial protecting position and the tone arm needle gradually comes into contact with the record without the pressure materially exceeding the usual needle pressure in scanning.

The invention relates to a tone arm assembly of the same kind, but in which the said member is used in the first place for a purpose which is different from that referred to above.

The fundamental idea of the invention is to use a member which facilitates the positioning of the tone arm, so that this can be effected without any trouble even under bad lighting conditions or in the dark, the tone arm needle being automatically guided into the first groove of the record.

According to the invention the member is combined with a part laterally projecting from the tone arm needle, which has to be placed on the edge of the record and by means of which the tone arm is brought over the record by the movement thereof. Furthermore the member is so shaped that the said variation of its position does not take place before the needle is over the edge of the record.

The member may, but need not be constructed in such a manner that it serves at the same time in the aforesaid known manner as a protecting member for the needle point.

The use of the tone arm assembly according to the invention procures the advantage that the position of the needle point need no longer be looked after. The part laterally projecting from the needle point is placed practically arbitrarily on the edge of the record. This part is provided on the tone arm in such a manner as the case may be the centre of rotation of the arm of the tone arm is chosen to be such that on swinging the arm inwardly to the shaft of the turntable, the said part, viewed from the centre of rotation of the arm, does not swing over but past the centre of the shaft. In this construction there is such a component on placing the said part on the edge of the record which component is derived from the peripheral speed of the record that the tone arm is automatically drawn to the record, so that the needle point, which is generally placed beyond the edge of the record, is brought over this edge. When the needle point has been brought at a suitable point in the proximity of the first groove, the aforesaid movable member is turned away or tilted, likewise by the movement of the record, so that the needle is placed on the record, the needle point automatically finding its way into the first groove of the record owing to the running out of the inwardly moving arm of the tone arm.

In order that the invention may be clearly understood and readily carried into effect, it will now be described more fully with reference to the diagrammatical figures of the accompanying drawing, given by way of example.

Fig. 1 shows the tone arm assembly 1 secured to the usual swing arm 2, the centre of rotation 3 of which is chosen to be such that the tone arm, on swinging inwards, describes a path 4 which, viewed from the centre of rotation 3 extends beyond the shaft 5 of the turntable.

When the projecting part 6 placed on the edge 7 of the record 8, the tone arm 1, owing to this special measure, is automatically drawn to the record.

As an alternative it is, however, also possible to choose the centre of rotation 3 to be such that the path of the tone arm needle of the tone arm 1 exactly extends over the shaft 5. In this case care should be taken that the projecting part 6 is provided at such a distance from the tone arm needle that this part describes again a path 4.

Figures 2, 3, 4, 5, 6:
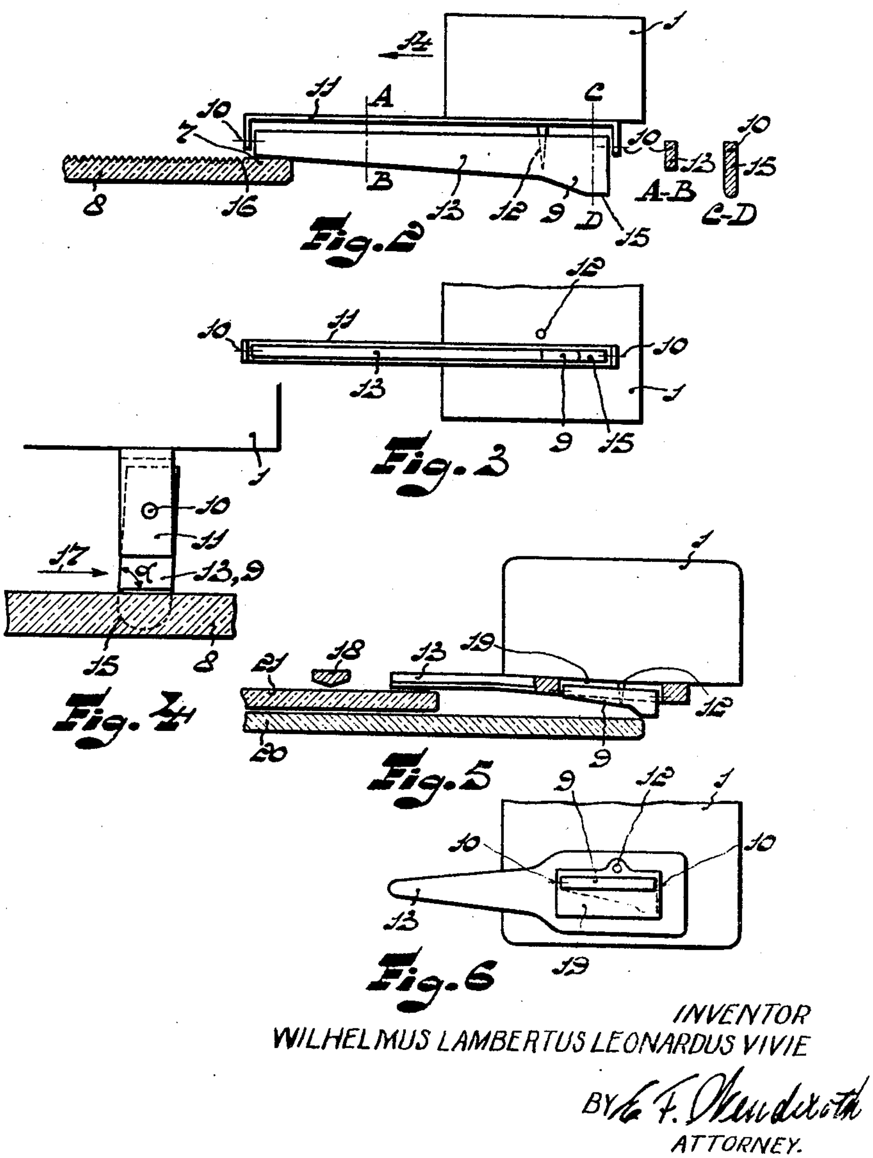

Figs. 2, 3 (bottom view) and 4 (lateral view) represent the tone arm according to the invention in detail. At the bottom of the tone arm 1 a member 9 is suspended so as to be rotatable about spindles 10 which are mounted in a frame 11 which is rigidly secured to the tone arm 1. The member 9 is combined with a part 13 laterally projecting from the tone arm needle 12; this part has to be placed on the edge 7 of the record 8. In the present case the member 9 and the projecting part 13 are integral with one another; they may however, also consist of separate parts, as may be seen from Figs. 5 and 6, which will be described hereinafter.

The projecting part 13 exhibits, on its side resting on the record 8, a flat edge, so that the combination consisting of 13 and 9, upon rotation of the record 8 (Fig. 2) in the direction of the observer, does not tilt about the spindles 10, since, moreover, the size of the lever arm between the spindle 10 and the record is made sufficiently small. Owing to the friction between the edge 7 of the record 8 and the projecting part 13, which is slightly wedge-shaped, the tone arm 1 is moved in the direction of the arrow 14 towards the record until the needle 12 is over the edge 7, the raised part 15 which forms part of member 9 contacting with the edge 7. The part 15 is slightly rounded at the bottom, in contradistinction to the remaining parts of the combination 13, 9 as is shown in the sections A—B and C—D. Owing to the rounded shape of the part 15 the combination 13, 9 is tilted in the direction of rotation of the record 8, which is still further promoted by the larger lever arm to the spindle 10. The point of the tone arm needle 12 is thus lowered on the edge 7, whilst the running-out movement of the tone arm 1 in the direction of the arrow 14 suffices to make the tone arm slide until the tone arm needle enters the first groove 16 of the record 8.

The groove 16 is thus automatically sought by the tone arm according to the invention, so that the device might be called a groove-finder.

It may be advisable to provide the flat edge at the bottom of the combination 13, 9 in such a manner that the angle $\alpha$ in Fig. 4 is slightly smaller than 90°. The risk of premature tilting of the said combination is thus reduced. In the case under view the direction of rotation of the record is indicated by the arrow 17.

On playing, the part 15 of the member 9 slides over the record, but this causes no wear worth mentioning of the record, because the member may be made very light, and moreover, of suitable material. The grooves are, moreover, sufficiently deep to be protected from damage owing to this light contact.

Figs. 5 and 6 (bottom view) represent, by way of example, another form of construction. As previously mentioned, the member 9 is in this case separated from the projecting part 13; the latter is constituted by a plate-shaped projection the point of which has a section denoted by 18 in Fig. 5. The plate exhibits an aperture 19 (Fig. 6) accommodating the journalled swing member 9.

After the projection 13 has been placed on the edge of the record, the tone arm 1 is brought, in this case as well, with its tone arm needle 12 over this edge, whereupon the member 9 tilts (Fig. 6 represents the tilted position in dotted lines), and the needle rests on the record. In the tilted state the member 9 is completely accommodated by the aperture 19.

The tone arm according to the invention is of particular importance for the use of an automatic record-hanger. In this case the automatically operating mechanism thereof can be much simpler since the tone arm can always be placed at the same point viz. at the periphery of the record having the largest diameter. This may be seen from Fig. 5. If there is only the record 20 having a diameter of say, 12'' and the tone arm is placed in the position shown in the drawing, the member 9 immediately tilts and the needle enters the first groove of the carrier 20. If a subsequent record 21 having a diameter of say 10'' is supplied to the turntable, the end of the projecting part 13 contacts with the edge of this record 21 and the tone arm is brought over the record 21 in the aforesaid manner.

It is obvious that these indications permit those skilled in the art to arrive at the purpose aimed at in various ways.

What I claim is:

1. A tone arm assembly for use in a phonograph and comprising, a tone arm, a needle extending downwardly from said tone arm, and a tone arm positioner comprising an elongated member mounted on said tone arm adjacent said needle and extending transversely of and downwardly from said tone arm and adapted for positioning on a rotating record, said member being characterized in that one part thereof is located at one side of said needle and another part thereof is located at the opposite side of said needle, said one part extending downwardly a lesser distance from said tone arm than does said needle, said another part extending a greater distance downwardly from said tone arm than does said needle, said one part gradually merging into said another part, and said another part being pivotally secured to said tone arm and adapted to be pivoted to a position, upon engagement by a moving record surface, wherein said another part no longer extends said greater distance from said tone arm than does said needle.

2. In combination, a record, a tone arm, said tone arm comprising a needle extending downwardly therefrom, means mounting said tone arm for movement to an operative position of said needle over said record, and a tone arm positioner comprising an elongated member mounted on said tone arm adjacent said needle and extending downwardly from said tone arm, said member being located on said tone arm so that said member is directed substantially radially with respect to said record when said tone arm is in said operative position, said member being characterized in that one part of said downwardly extending member is located at that side of the needle which faces toward the center of said record and another part of said member is located at the opposite side of said needle, said one part extending a lesser distance downwardly from said tone arm than does said needle, said another part extending a greater distance downwardly from said tone arm than does said needle, said one part gradually merging into said another part, and said another part being pivotally secured to said tone arm and adapted to be pivoted to a position, by engagement with the moving record surface, wherein said another part no longer extends said greater distance from said tone arm than does said needle.

3. In combination, a phonograph turntable, a tone arm pivotally mounted at an end thereof adjacent said turntable so that the said arm may be swung to an operative position above said turntable, a pick-up unit mounted at the other end of said arm, means for mounting a needle on said unit, a tone arm positioner comprising an elongated member pivotally mounted on the bottom of said unit and extending transversely of and latterally from said tone arm as well as downwardly therefrom and having the bottom edge thereof adapted to rest on the surface of a record positioned on said turntable, said member having a first portion of said edge adjacent said needle mounting means which is rounded and a second portion of said edge remote from said needle mounting means which is flattened.

WILHELMUS LAMBERTUS
LEONARDUS VIVIE.

REFERENCES CITED

The following references are of record in the file of this patent:

UNITED STATES PATENTS

| Number | Name | Date |
|---|---|---|
| 1,428,828 | Ahearn | Sept. 12, 1922 |
| 2,214,509 | Otto | Sept. 10, 1940 |